US008332292B2

(12) United States Patent
Spirgel et al.

(10) Patent No.: US 8,332,292 B2
(45) Date of Patent: *Dec. 11, 2012

(54) METHOD AND SYSTEM FOR SECURITIZING A CURRENCY RELATED COMMODITY

(75) Inventors: Jonathan S Spirgel, Great Neck, NY (US); Laura S Melman, Springfield, NJ (US)

(73) Assignee: The Bank of New York Mellon Corporation, New York, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/236,863

(22) Filed: Sep. 28, 2005

(65) Prior Publication Data
US 2006/0111999 A1    May 25, 2006

Related U.S. Application Data

(63) Continuation-in-part of application No. 10/680,589, filed on Oct. 6, 2003.

(60) Provisional application No. 60/415,764, filed on Oct. 4, 2002.

(51) Int. Cl.
*G06Q 40/00* (2012.01)
(52) U.S. Cl. .......................................... 705/35; 705/38
(58) Field of Classification Search ............ 705/35, 705/38
See application file for complete search history.

(56) References Cited

U.S. PATENT DOCUMENTS

| | | | |
|---|---|---|---|
| 5,671,364 A * | 9/1997 | Turk ............................... | 705/39 |
| 6,088,685 A | 7/2000 | Kiron et al. | |
| 6,907,402 B1 | 6/2005 | Khaitan | |
| 6,952,683 B1 * | 10/2005 | Gerhard ........................... | 705/37 |
| 7,409,366 B1 | 8/2008 | Amanat et al. | |
| 7,584,137 B2 | 9/2009 | Pham | |
| 2001/0034688 A1 * | 10/2001 | Annunziata ...................... | 705/37 |
| 2002/0002532 A1 | 1/2002 | Tso | |
| 2002/0042770 A1 | 4/2002 | Slyke et al. | |
| 2002/0046154 A1 * | 4/2002 | Pritchard ......................... | 705/37 |
| 2002/0082903 A1 | 6/2002 | Yasuzawa | |

(Continued)

OTHER PUBLICATIONS

Sheryl Jean Journal-Bulletin Business Writer. (Nov. 5, 1989). Silver is a good buy but may be quite risky. Providence Journal,p. F-08. Retrieved Oct. 25, 2010, from Business Dateline. (Document ID: 596861821).*

(Continued)

*Primary Examiner* — Thomas Dixon
*Assistant Examiner* — Benjamin S Fields
(74) *Attorney, Agent, or Firm* — Pillsbury Winthrop Shaw Pittman LLP

(57) ABSTRACT

Systems and methods for providing a tradable (e.g., exchange-listed) instrument by securitizing foreign currency using a foreign currency trust or other special-purpose vehicle that is established to hold one or more particular foreign currency and to issue foreign currency trust shares and/or receipts corresponding to the value of the foreign currency(s) held by the Trust. The foreign currency trust shares may represent a proportional interest in the Trust and/or the foreign currency held by the trust. The Trust may include one or more Trust accounts to receive and store the foreign currency deposited with the Trust. The Trust can operate to receive an investment amount in a first currency and provide shares or Trust receipts having a value in a second currency. The shares or receipts of the trust can be listed, quoted, and traded on a trading system.

23 Claims, 9 Drawing Sheets

U.S. PATENT DOCUMENTS

| | | | |
|---|---|---|---|
| 2002/0087454 | A1 | 7/2002 | Calo et al. |
| 2002/0161692 | A1* | 10/2002 | Loh et al. .................. 705/37 |
| 2003/0149652 | A1 | 8/2003 | Pham |
| 2003/0191708 | A1 | 10/2003 | Turk |
| 2004/0193530 | A1 | 9/2004 | Hausman |
| 2004/0199442 | A1 | 10/2004 | Haberle |
| 2004/0267655 | A1 | 12/2004 | Davidowitz et al. |
| 2005/0033672 | A1 | 2/2005 | Lasry et al. |
| 2005/0038726 | A1 | 2/2005 | Salomon |
| 2005/0044022 | A1 | 2/2005 | Spirgel |
| 2005/0171894 | A1 | 8/2005 | Traynor |
| 2005/0192889 | A1 | 9/2005 | Sauter |
| 2007/0179874 | A1 | 8/2007 | Spirgel et al. |
| 2009/0063366 | A1 | 3/2009 | Friedman et al. |
| 2011/0112951 | A1 | 5/2011 | Gould |
| 2011/0258102 | A1 | 10/2011 | Blasi |
| 2012/0036059 | A1 | 2/2012 | Ionascu et al. |

OTHER PUBLICATIONS

International Search Report issue in PCT/US06/37701, mailed Sep. 4, 2007, 2 pages.

Written Opinion of the International Searching Authority, mailed Sep. 4, 2007, 4 pages.

"Launch of UK Listed Gold Bullion Securities & New Initiative With World Gold Council", World Gold Council Limited, Dec. 2, 2003.

Calandra, Thom, "New Fund Will Revolutionize Bullion ownership", CBS.MarketWatch.com.

Calandra, Thom, "New NYSE 'Paper Gold' Will Spark Investment Demand", CBS.MarketWatch.com.

Central Gold-Trust IPO Prospectus, Jun. 25, 2003.

Equity Gold Trust Form S-1, May 13, 2003.

IndexFunds.com Staff, "Gold ETF to Test Retail Investor Demand", Jun. 11, 2003.

kitco.com. re The World Gold Council. http.www.kitco.com/iind/Appel/jun262003.html.

Pandya, Kiran, "Companies Find New Shin to Gold Glitter. web.midday.com/news/business/2003/july/58479.htm." Jul. 14, 2003.e.

Pisani, Bob, "Coming Soon: Buy Gold Like a Stock. http://moneycentral.msn.com/content/CNBCTV/Articles/TVReports P50438.asp".

Radhakrishnan, Sankar, WGC to Unveil New Ad Campaign.

The Gold Equity Share: An Idea Whose Time Has Come.

Calandra, Thom, "Calandra on Gold". CBS.MarketWatch.com.

"Launch if UK Listed Gold Bullion Securities & New Initiative with World Gold Council" World Gold Council Limited, Dec. 2, 2003.

Gold's lustre as investment fades; Analysts hedge their bets on precious metal's future:[Final Edition]. (Oct. 17, 1988). The Gazette, p. B4. Retrieved Oct. 25, 2010, from ProQuest Newsstand. (Document ID: 161270891).

* cited by examiner

US 8,332,292 B2

METHOD AND SYSTEM FOR SECURITIZING A CURRENCY RELATED COMMODITY

This application claims benefit, and is a continuation-in-part, under 35 U.S.C. 120 to U.S. Non-Provisional patent application Ser. No. 10/680,589, entitled "Systems and Method for Securitizing a Commodity", filed Oct. 6, 2003, which in turn claims benefit under 35 U.S.C. 119 to U.S. Provisional Patent Application No. 60/415,764, entitled "Method and System for Equitizing a Commodity," filed Oct. 4, 2002, both applications being incorporated herein in their entirety.

BACKGROUND OF THE INVENTION

1. Field of the Invention

The present invention relates to exchange-traded equity securities, and particularly to a method and system for securitizing a physical commodity.

2. Description of Related Art

There are many barriers to owning certain commodities that have prevented investors from investing in the commodities, which, in turn, can lead to a less liquid and transparent market. Foreign currency (i.e., non-United States of America currency), for example, has historically had barriers to entry for individual investors. Barriers exist in both investing logistics and in cost. Most currency trading is done by banks and broker dealers, through spot transactions, forwards and foreign exchange swaps. The difficulty in understanding the logistics required in these transactions, as well as the fees for these transactions, have made foreign currency markets relatively inaccessible to individual investors and to smaller institutional investors as well. In addition, the foreign currency market is an over-the-counter market, lacking the transparency and economy of exchange-traded securities. The current fee structure for such foreign currency transactions is particularly disadvantageous to active traders.

Regardless of whether an investor is institutional or individual, there is no mechanism for investing in foreign currency that does not require the use of spot contracts, forwards or futures, which can be costly. The economy of scale required for investing on the level of larger U.S. banks and broker/dealers is out of reach for most individual investors.

Accordingly, there is no existing mechanism that facilitates trading in foreign currency, in such a way as to overcome these historical barriers.

SUMMARY OF THE INVENTION

The present invention comprises systems and methods for securitizing foreign currency. According to at least one embodiment of the invention, a foreign currency trust or other special-purpose vehicle (hereafter collectively referred to as a "Trust") is established to hold a particular foreign currency and to issue foreign currency trust shares and/or receipts corresponding to the value of the foreign currency held by the Trust. The foreign currency trust shares may represent a proportional interest in the Trust and/or the foreign currency held by the trust. The Trust may include one or more Trust accounts to receive and store the foreign currency deposited with the Trust.

BRIEF DESCRIPTION OF THE DRAWINGS

Features, aspects, and details of the various embodiments of the invention are described in conjunction with the attached drawings, in which.

DETAILED DESCRIPTION OF THE INVENTION

While some of the embodiments below are described in relation to the securitization of foreign currency, it will be understood that the systems and methods described herein can apply equally to other types of commodities. Other commodities can include, for example, silver, platinum, palladium, ferrous and base metals, oil and gas products, energy and industrial minerals, and soft commodities such as sugar or grains, to name just a few. Thus, the following descriptions should not be understood to limit the system and methods described herein to any particular type of commodity.

As one of ordinary skill in the art would recognize, the securitizing of a commodity results in an exchange-tradable instrument that represents ownership of an interest in commodity assets. As explained herein, in accordance with at least one embodiment of the invention, those assets may include, for example, an amount of a first currency, e.g., a foreign currency, having a particular value. Moreover, as with securitizing of any commodity, the value of the corresponding exchange-tradable instrument has a value; however, it would be well understood by one of ordinary skill in the art that, when the assets include foreign currency, the value of the exchange-tradable instrument is denominated in a second currency different from the first currency.

Moreover, shares resulting from the securitization may represent undivided beneficial interests in the assets (first currency) with a market value (denominated in the second currency) that fluctuates in response to, for example, changes in value of the underlying first currency. Thus, one of ordinary skill in the art would recognize that shares may have a value representative of the relative values of the first currency, the second currency or both. For example, if the exchange-tradable instrument resulting from securitization is tradable on a U.S. exchange, a first currency, i.e., that currency included in the Trust assets, may be a non-U.S. currency and the second currency may be U.S. dollars.

The utility of securitizing various commodities should be readily understood by one of ordinary skill in the art because it is well known that securitization enables the purchase or redemption of corresponding shares using a trading system. Thus, shares may be issued to an investor in exchange for an investment amount. Moreover, as would be recognized by one of ordinary sill in the art, the exchange-tradable instrument resulting from securitization may be the basis for purchase/redemption of options through an options trading system.

Figure 1:
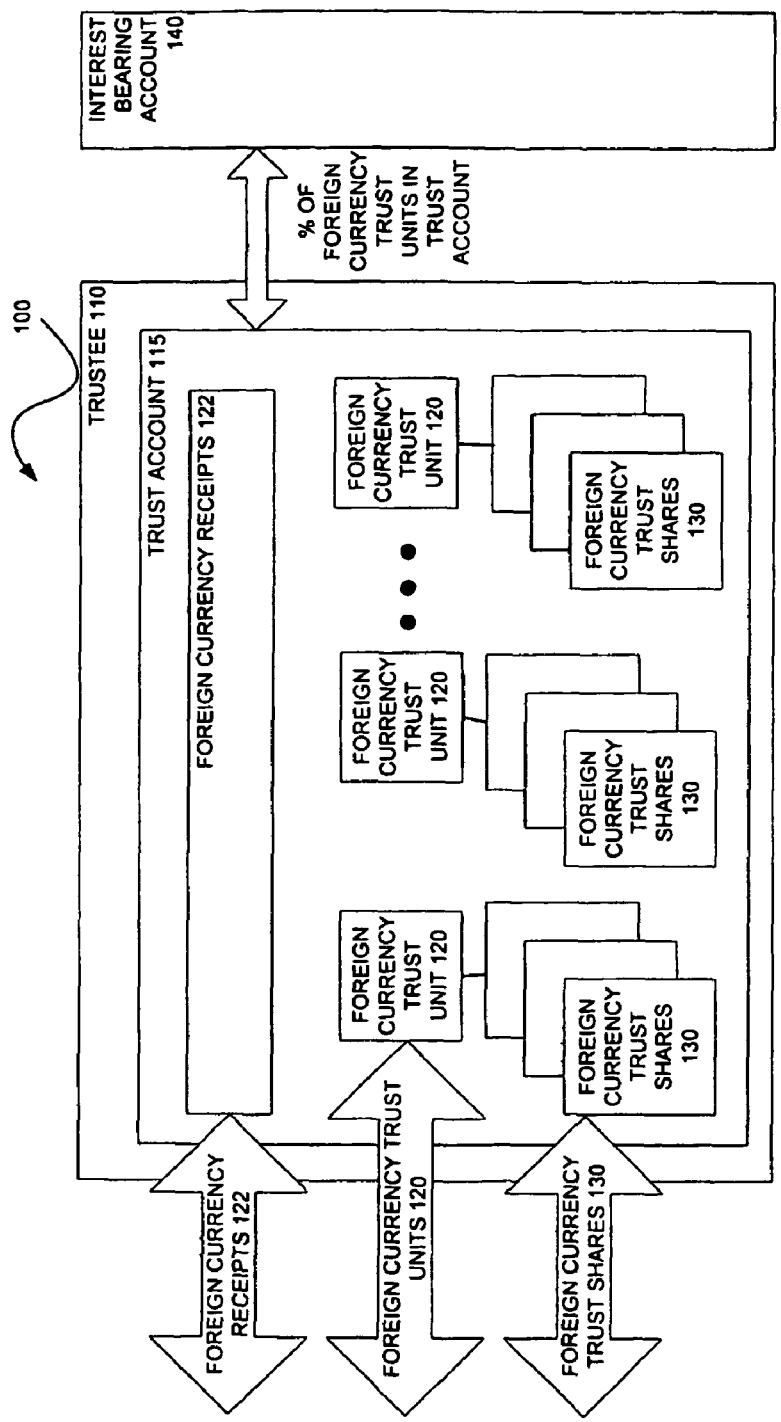
FIG. 1 is a diagram illustrating a foreign currency trust in accordance with one embodiment.

FIG. 1 illustrates a Trust 100 according to an embodiment of the present invention. Particularly, Trust 100 comprises a Trustee 110, a Trust account 115, a number (N) of foreign currency units 120, and a number of equity foreign currency trust shares 130 representing an interest in Trust 100. In accordance with at least one embodiment, Trustee 110 serves as both the administrator of the Trust 100 and custodian of the Trust account 115. According to at least one other embodiment, a Trustee(s) serves as the administrator of the Trust 100 while a separate entity is appointed act as custodian for the Trust accounts. Assets held by the Trust 100 include foreign currency trust units 120, which can include foreign currency such as Euros, Yen, Pounds, etc., which may be individually identified and tracked by the serial number(s) and/or foreign currency receipts 122 representing an interest in amount of foreign currency (explained herein). However, Trust 100 is specific to only one type of foreign currency. Thus, Euros and Yen may not be included in the same trust; rather, each foreign currency type must have its own trust.

The Trust 100 can be administered by a Trustee 110 (i.e., a trustee, administrator, issuing agent, or the like) that among other things, receives and stores the foreign currency in the Trust account(s) 115 for and on behalf of participants of the Trust 100 (i.e., authorized depositors), issues foreign currency trust shares to each participant corresponding to the value of the foreign currency being stored on their behalf and administers the Trust 100 on a day-to-day basis by, for example, keeping record of Trust expenses and periodically determining the net asset value of the foreign currency trust shares. Holders of the foreign currency trust shares may redeem them to receive actual units of the foreign currency stored in the Trust account, e.g., foreign currency.

According to at least one embodiment, the Trustee may appoint one or more custodians or sub-custodians to maintain and administer the foreign currency(ies) for and on behalf of the Trustee. Such a custodian or sub-custodian may be a recognized and/or authorized depository for the particular commodity in question. Alternatively, the custodians/sub-custodians may be appointed by the sponsor of the Trust, the issuer of the commodity shares and/or any other entity recognized as the offeror or registrant of the commodity shares.

The foreign currency trust shares can be traded on a major securities exchange such as the New York Stock Exchange (NYSE), the American Stock Exchange (AMEX), the National Association of Securities Dealers Automatic Quotation System (NASDAQ), or any other exchange or Electronic Communication Network (ECN), thereby creating a robust secondary market for the foreign currency trust shares.

According to at least one other embodiment, Trust 100 may also hold an amount of U.S. currency from fees collected, the proceeds of cash market transactions and the like. U.S. currency held in Trust account 100 can, in accordance with certain embodiments, be invested, e.g., in time deposits, overnight accounts, money market, funds, etc. Trust 100 may also accrue interest and/or dividends and Trustee 110 may remit dividends and/or other distributions to participants in Trust 100. Interest and/or dividends may also be converted into foreign currency trust units.

Equity foreign currency trust shares 130 can be issued by Trustee 110 for a value corresponding to an amount of foreign currency trust units 120 held by the Trust in the Trust account 115. For example, one equity share 130 can correspond to one foreign currency unit 120, to a fractional interest in one foreign currency unit as needed to make the equity shares affordable and attractive to potential investors.

As would be well understood by one of ordinary skill in the art, the securitizing of the Trust assets creates a Trust share that is capable of being traded on a trading system and able to be purchased and redeemed through the Trust.

In operation, participants in Trust 100 can obtain new foreign currency trust shares 130 of Trust 100 by depositing physical foreign currency trust units 120 into Trust account 115 in exchange for a number of foreign currency trust shares 130 of corresponding value. Participants can also redeem foreign currency trust shares 130 of the Trust 100 by transferring their foreign currency trust shares 130 to Trustee 110 and receiving corresponding amounts of foreign currency trust units 120 in return.

It should also be noted that in accordance with at least one embodiment of the invention, foreign currency receipts representing foreign currency can also be deposited and/or redeemed, either to make up for the difference between an amount of foreign currency trust units 120 being deposited or returned and the value of the foreign currency trust shares 130 being created or redeemed as explained below, or in place of the actual deposit and transfer of units of physical foreign currency 120.

In accordance with at least one embodiment, only certain participants in the Trust are authorized to create and redeem foreign currency trust shares 130 of Trust 100. For example, in accordance with at least one embodiment, an authorized participant must be a registered broker-dealer or other securities market participant who is also a participant in a Central Securities Depository (CSD), which acts as the security depository for foreign currency trust shares 130. In accordance with at least one other embodiment, however, participant in the Trust 100 can create foreign currency trust shares 130 as long as they give Trustee 110 instructions as to which, e.g., CSD account is to be used.

Furthermore, a limit can be imposed on the number of shares that can be redeemed and/or created at a given time. For example, in accordance with at least one embodiment, the Trust will only create and/or redeem foreign currency trust shares 130 in baskets of 100,000 shares at a time. An authorized participant can create baskets of shares and subsequently make the foreign currency trust shares 130 available in smaller amounts to individual investors in the secondary market. Alternatively, the Trustee 110 may limit requests to create and/or redeem foreign currency trust shares 130 to only shares that are at or above a specified minimum value. For example, in accordance with at least one embodiment, the Trustee 110 may not create foreign currency trust shares 130 for a request that is below a minimum value of approximately $400,000.

In accordance with at least one other embodiment, any individual can redeem shares as long as they redeem through and authorized participant, e.g., a participant with a CSD account. In such an embodiment, a minimum number of foreign currency trust shares 130 to be redeemed can still apply, but this minimum may be set at a lower threshold in order to appeal, for example, to retail customers. In accordance with at least one embodiment, for example, a minimum threshold on the range of 40-80 foreign currency trust shares 130 can be used. However, a transaction fee may still apply as with other redemption transactions described herein.

In accordance with various embodiments, Trust account 115 can also include a certain amount of foreign currency receipts 122. Foreign currency receipts 122 may be used to represent amounts of foreign currency that can then be used in conjunction with the creation and redemption of foreign currency trust shares 130. For example, upon creation or redemption of foreign currency trust shares 130, a relatively small amount of foreign currency receipts, representing foreign currency 122, can be deposited with, or withdrawn from, Trust account 115. The use of the foreign currency receipts can be necessary when, for example, the foreign currency delivered to, or withdrawn from, Trust account 115 can vary slightly from unit to unit. Thus, it is not always possible to deliver the exact amount of foreign currency corresponding to the foreign currency unit(s) 120 being created or redeemed.

Foreign currency receipts 122 can be traded in small increments, down to fractions of a particular foreign currency unit 120, $1/100^{th}$ for example. In accordance with at least one embodiment, physical foreign currency 120 delivered for a creation comprise units of foreign currency up to but not over the amount required, with the shortfall made up by the delivery of foreign currency receipts 122 from a participant. Upon redemption, Trustee 110 can deliver to a participant up to but not over the amount of foreign currency units required, with the shortfall made up by Trustee 110 delivering foreign currency receipts 122 to the participant. In accordance with at least one other embodiment of the present invention, U.S. dollars can be provided instead of foreign currency receipts 122 to make up the difference between the creation and redemption ounces required and the actual foreign currency delivered to or by the Trust 100.

It should be noted that foreign currency can be maintained by a bank or a broker dealer in a custody account as part of a general pool of foreign currency. Depending on the embodiment, trades in foreign currency can take place between foreign currency accounts by trading the foreign currency or by trading foreign currency receipts. For example, in at least one embodiment, trades can be cleared through transfers in or out of foreign currency accounts at one or more banks or broker/dealer firms. The firms can then clear their net trades with one another through delivery of physical foreign currency, book entry transactions, or delivery of foreign currency receipts.

Thus, in accordance with at least one embodiment, when Trustee 110 receives foreign currency receipts, individual foreign currency trust units 120 are not assigned to foreign currency trust 115. Similarly, when Trustee 110 delivers foreign currency receipts, no corresponding foreign currency trust units 120 are delivered; however, depending on the embodiment, foreign currency receipts can be transferable to foreign currency, i.e., to foreign currency trust units 120 in foreign currency trust 115, on demand.

According to at least one embodiment, Trustee 110 is not the custodian of Trust account 115. Rather, custody of Trust account 115 may be delegated to one or more custodians and sub-custodians who actually receive and store the foreign currency trust units 120 for Trustee 110. Trustee 110 may appoint such a custodian/sub-custodian if, for example, Trustee 110 does not have a significant foreign currency exchange capabilities or Trustee 110 is not a qualified depository of foreign currency. Moreover, at the direction of Trustee 110, the custodian/sub-custodian can take delivery of and distribute foreign currency trust units 120 directly from/to the participants. If Trustee 110 does have some capacity to receive and store foreign currency, custody of the foreign currency can be shared among Trustee 110 and one or more custodians and sub-custodians. For purposes of this application, custodian and sub-custodian shall hereafter be referred to collectively as "Custodian."

Figure 2:
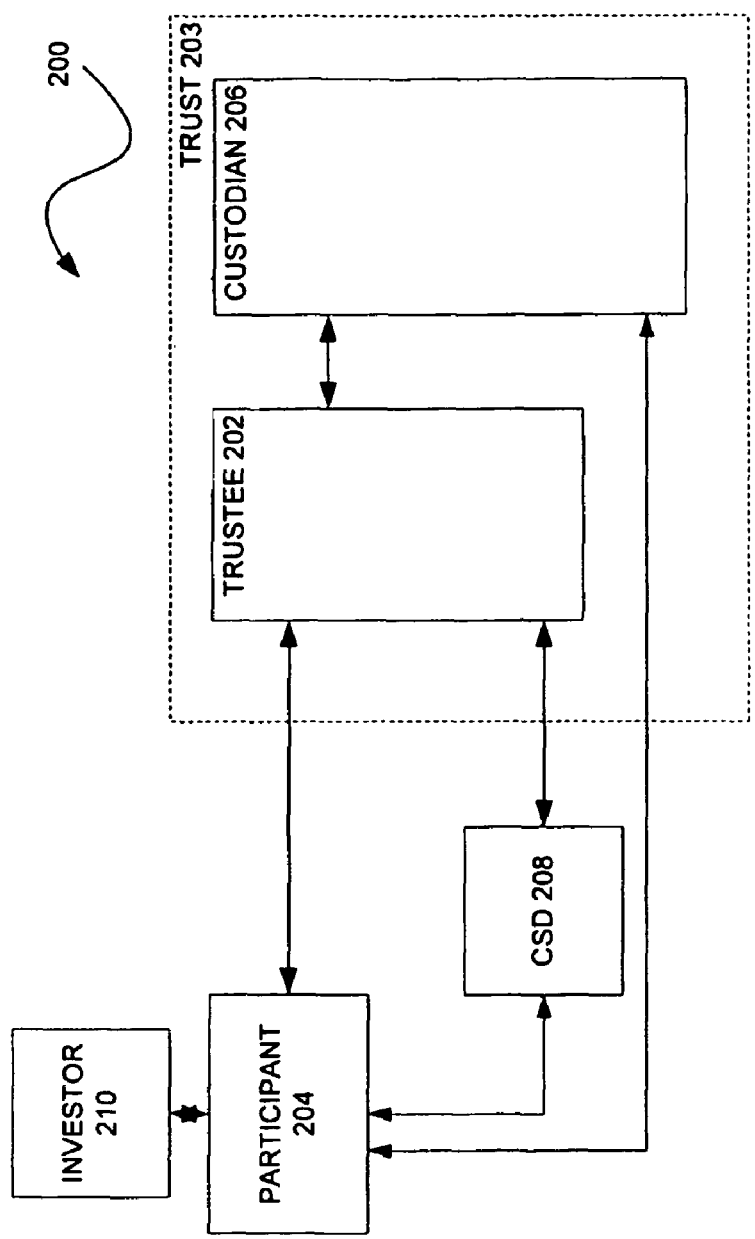
FIG. 2 is a diagram illustrating a foreign currency trust system comprising a custodian in accordance with another embodiment of the invention.

FIG. 2 is a diagram of a foreign currency trust system 200 in accordance with at least one embodiment of the invention including Trustee 202, participant 204, Trust 203 and a Custodian 206. In accordance with at least one embodiment, participant 204 is a registered broker-dealer or other securities market participant who is also a participant in a CSD 208. After Trustee 202 has issued a basket of shares to participant 204, the shares can be made available to other investors 210 via one or more securities exchanges.

In general, the process of creating foreign currency foreign currency trust shares 130 may be as illustrated in FIG. 2 and explained herein in accordance with at least one embodiment of the invention. A Participant 204 sends a creation order to Trustee 202, which may include a request to create a specified number of foreign currency trust shares 130 or to create a number of shares corresponding to a specified amount of foreign currency. Trustee 202 may respond to the creation order with an acknowledgement, which acknowledgement may include instructions to the participant 204 on how to deliver the foreign currency trust units 120 to the Trust account 115 and in what amounts. Trustee 202 may also notify the Custodian 206 of the pending delivery of foreign currency trust units 120 to Trust account 115. Custodian 206 notifies Trustee 202 when the required amount of foreign currency trust units 120 have been deposited into the Trust account 115 by participant 204. Trustee 202 then instructs CSD 208 to create and release a corresponding number of foreign currency trust shares 130 to participant 204.

Figure 3:
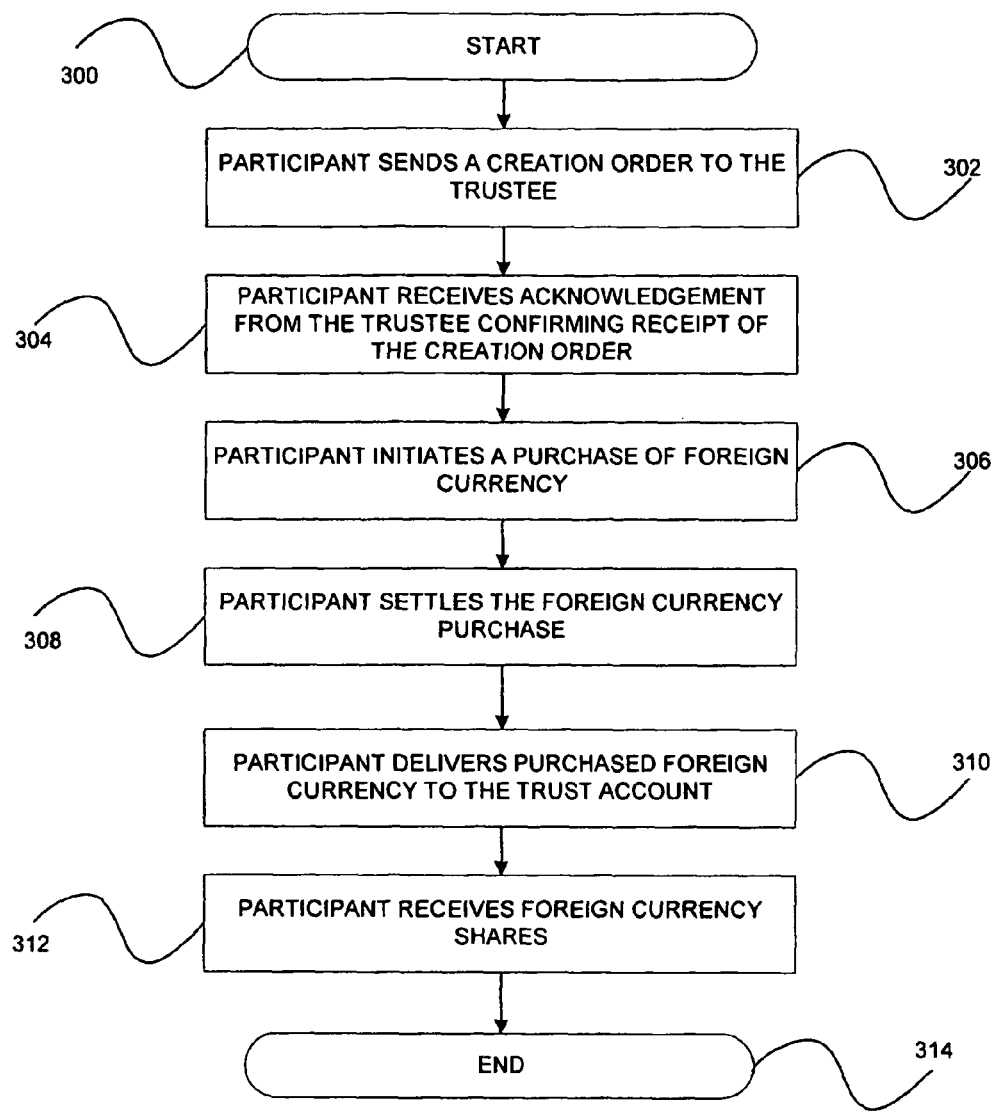
FIG. 3 is a flow chart illustrating a method for creating shares within the system of figure two from the perspective of a participant in accordance with one embodiment of the invention.

FIG. 3 is a flow chart depicting an exemplary process for creating foreign currency trust shares 130 from the viewpoint of participant according to one embodiment of the invention. The process begins at 300 and proceeds to 302, at which the participant sends a creation order to the Trustee. The creation order may indicate the amount of shares requested, the number of baskets of shares requested and/or the amount of units to be deposited.

It should be noted that there often will be costs associated with maintaining the Trust. Thus, the actual value of a foreign currency trust share may be based on or equal to the value of the associated amount of units minus an allocated portion of any costs associated with maintaining the Trust and/or with the creation or redemption of shares.

The process proceeds to 304, at which the participant receives acknowledgement from the Trustee confirming receipt of the creation order. Subsequently, at 306, the participant initiates an acquisition of foreign currency sufficient to cover the requested shares. For example, if the participant has requested the creation of one basket of shares corresponding to 500,000 Euros, then the participant initiates the acquisition of that 500,000 Euros at 306. The process then proceeds to 308, at which the participant settles the foreign currency acquisition and delivers the acquired foreign currency to the trust account at 310. The participant may also tender U.S. dollars or foreign currency receipts to the Trust account to make up for any shortfall between the actual amount of foreign currency delivered at 310 and the amount required to cover the requested shares. In exchange for the delivered foreign currency, and foreign currency receipts or U.S. dollars, as the case may be, the participant receives foreign currency trust shares at 312. Subsequently, the process proceeds to 314, at which the process ends.

A participant can acquire foreign currency in various ways. For example, a participant can purchase futures and convert the foreign currency futures into foreign currency units in what is conventionally referred to as an "Exchange For Physical" (EFP) transaction. In such transactions, the participant may maintain a custodial account with at least one foreign currency depository. Furthermore, assuming that the Trust account is also held by one of the depositories (i.e., the Custodian is also a foreign currency depository) the participant can request that the foreign currency depository transfer foreign currency from the participant's depository account to the Trust account. Clearing time of foreign currency from a depository to the Trust account can be one day, assuming the Custodian is also a depository bank, as the case may be.

Alternatively, a participant may purchase foreign currency units in a cash (spot) market transaction by simply buying the required amount of units on the open market from a currency trader, or from the Custodian. The currency trader can deliver the purchased units to the Trust account. A participant may also acquire foreign currency units through a forward transaction, which settles on a date beyond the typical spot settlement date. In addition, participants may "swap" one currency for the foreign currency units, or use foreign currency options to acquire the foreign currency units. Because the participant may be required to pay all costs associated with delivering the foreign currency into and out of the Trust account, creation of shares through one of the above market transactions has potentially high costs for participant.

Figure 4:
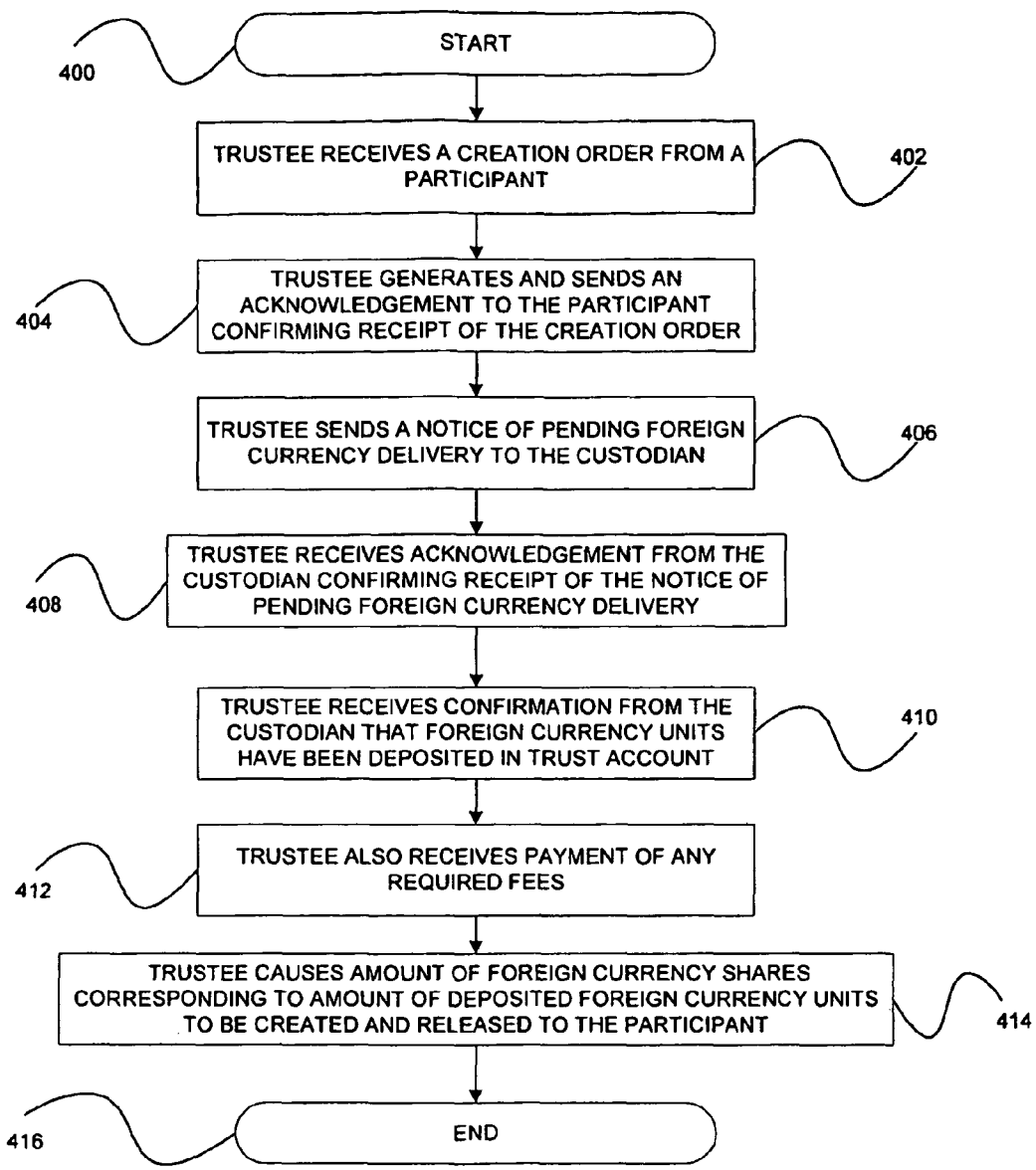
FIG. 4 is a flow chart illustrating a method for creating shares within the system of figure two from the perspective of a Trustee in accordance with one embodiment of the invention.

FIG. 4 is a diagram illustrating an exemplary process for creating foreign currency trust shares from the perspective of the Trustee in accordance with at least one embodiment of the invention. The process begins at 400 and proceeds to 402 at which the Trustee receives a creation order from a participant. The process then proceeds to 404, at which the Trustee generates and sends an acknowledgement to the participant confirming receipt of the creation order. The acknowledgement may include instructions on how to deliver the foreign currency to Trust account.

Control then proceeds to 406, at which the Trustee sends a notice of pending foreign currency delivery to the Custodian, which notice may include, for example, an amount of units to be delivered and an identity of the participant. At 408, Trustee receives an acknowledgement from the Custodian confirming receipt of the notice of pending foreign currency delivery.

Subsequently, at 410, the Trustee receives confirmation from the Custodian that foreign currency units have been deposited in Trust account. At 412, the Trustee also receives payment of any required fees, e.g., transactions fees to cover costs and expenses of the Trust, which fees may be paid by, for example, the participant or from the assets held in the Trust account. The process then proceeds to 414, at which the Trustee causes an amount of foreign currency trust shares corresponding to the amount of deposited foreign currency units to be created and released to the participant. Subsequently, the process proceeds to 416, at which the process ends.

In accordance with at least one embodiment of the invention, the shares are created and released to the participant through the CSD. Alternatively, the Custodian may initiate the release of the shares instead of the Trustee.

Figure 5:
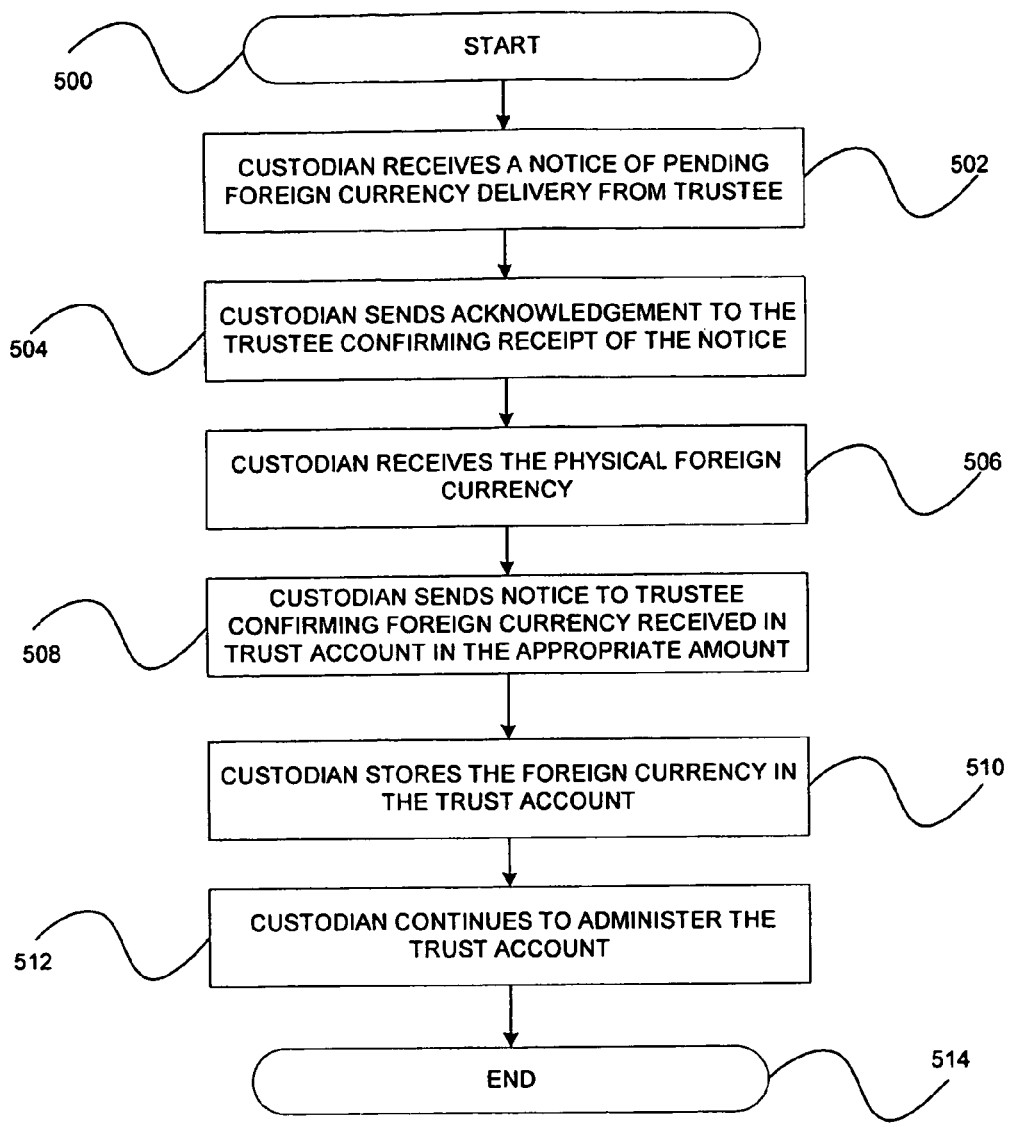
FIG. 5 is a flow chart illustrating a method for creating shares within the system of figure two from the perspective of a custodian in accordance with one embodiment of the invention.

FIG. 5 is a flow chart illustrating an exemplary process for creation of foreign currency trust shares from the perspective of a Custodian in accordance with at least one embodiment of the invention. The process begins at 500 and proceeds to 502, at which the Custodian receives a notice of pending foreign currency delivery from a Trustee, which notice may include, for example, an amount of foreign currency units to be delivered and an identity of a participant initiating the delivery. Subsequently at 504, the Custodian sends an acknowledgement to the Trustee confirming receipt of the notice of pending foreign currency delivery.

The process continues to 506, at which the Custodian takes receipt of the foreign currency, e.g., through and electronic transfer, physical delivery, etc., and, in at 508, sends a notice to the Trustee confirming that the foreign currency was received in the Trust account in the appropriate amount. Subsequently, at 510, the Custodian stores the foreign currency in the Trust account, and, at 512, continues to administer the Trust account. Among other things, the Custodian may periodically generate and issue reports to the Trustee indicating the amount of foreign currency held in the Trust account and showing activity in the account over a specified period. Subsequently, the process proceeds to 514, at which the process ends.

Referring again to FIG. 2, in accordance with at least one embodiment of the invention, the process of redeeming foreign currency trust shares may be as follows. Participant 204 may send a redemption order to Trustee 202. Trustee 202 may instruct participant 204 to tender the shares to Trustee's CSD account. Trustee 202 may confirm that the shares have been transferred into the Trustee's CSD account. Thereafter, Trustee 202 may tender a corresponding amount of foreign currency to participant 204 by, for example, instructing Custodian 206 to transfer foreign currency in Trust account 115 to an account associated with participant 204 and receiving confirmation from Custodian 206 that the transfer is complete.

Figure 6:
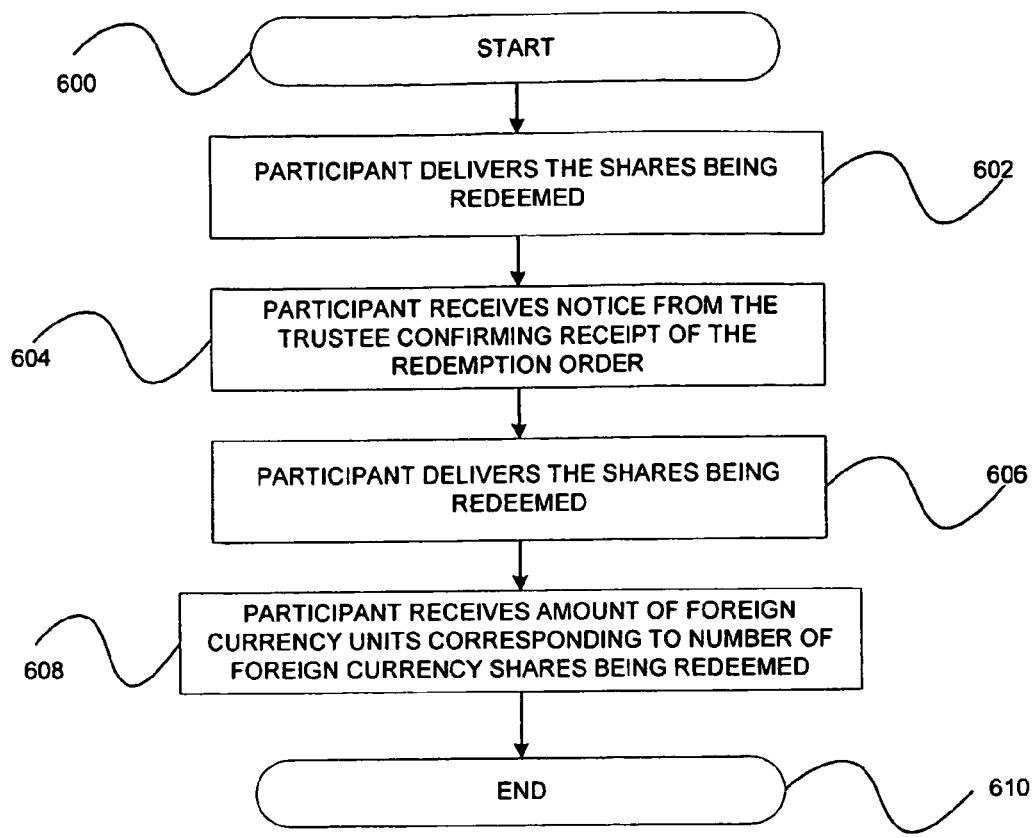
FIG. 6 is a flow chart illustrating a method for redeeming shares within the system of figure two from the perspective of a participant in accordance with one embodiment of the invention.

Turning to FIG. 6, a flow chart illustrates an exemplary process for redeeming foreign currency trust shares from the perspective of the participant in accordance with at least one embodiment of the invention. The process begins at 600 and continues to 602, at which a participant sends a redemption order to the Trustee. The redemption order may indicate the number of foreign currency trust shares 130, or baskets of shares, being redeemed.

At 604, the participant receives notice from the Trustee confirming receipt of the redemption order. The process continues to 606, at which the participant delivers the shares being redeemed by, for example, transferring the shares from its CSD account to the Trustee's CSD account. Subsequently, at 608, the participant receives an amount of foreign currency units corresponding to the number of foreign currency trust shares being redeemed. A certain amount of cash or foreign currency receipts may also be delivered, or transferred to an account associated with the participant to make up for any difference between the actual amount of units delivered at 608 and the amount of foreign currency required to cover the redeemed shares. Alternatively, if the amount of foreign currency delivered exceeds the requisite amount based on the redeemed shares, then the participant may be required to deliver a certain amount of cash or foreign currency receipts to account for the excess. Subsequently, the process proceeds to 610, at which the process ends.

Figure 7:
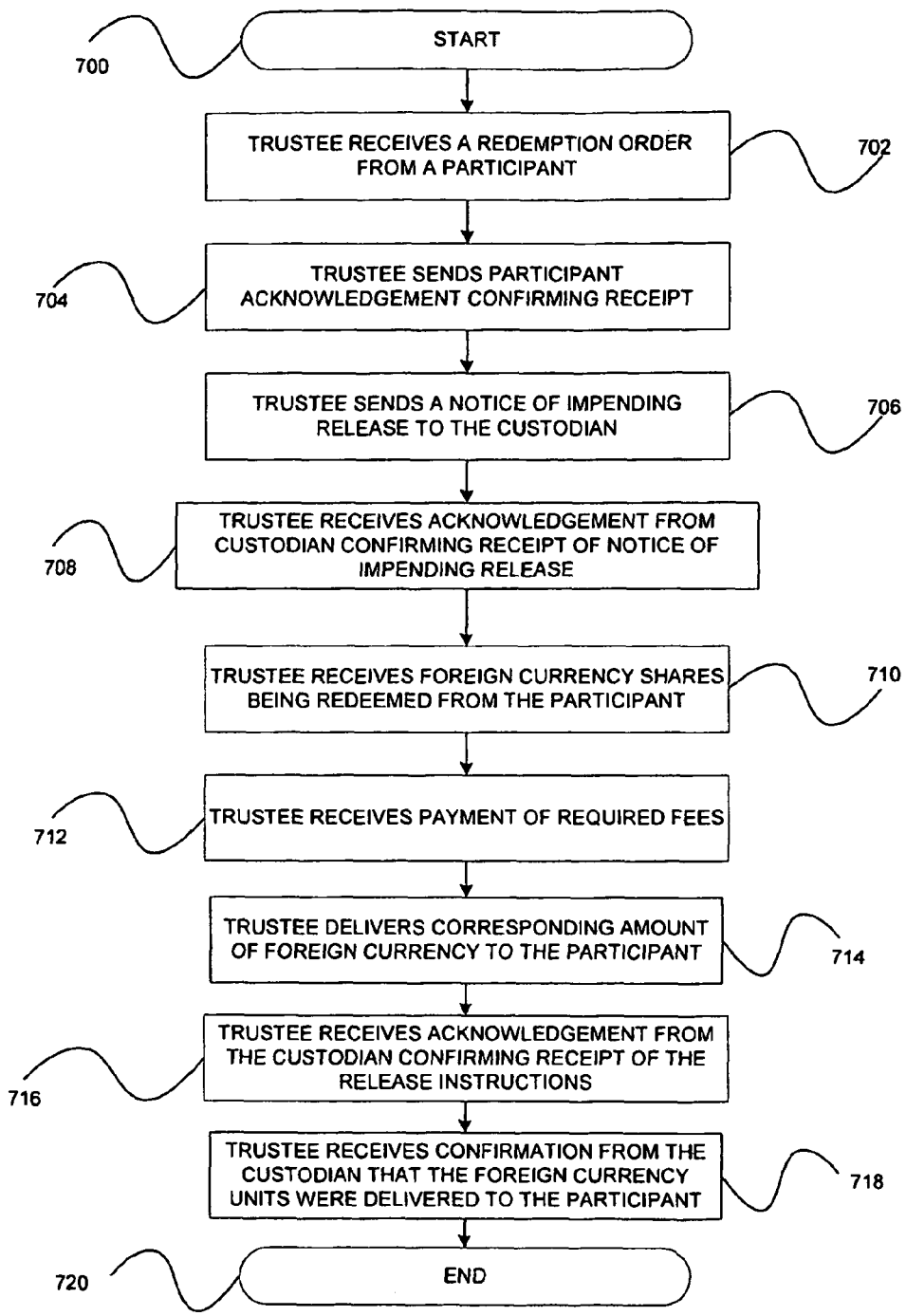
FIG. 7 is a flow chart illustrating a method for redeeming shares within the system of figure two from the perspective of a Trustee in accordance with one embodiment of the invention.

FIG. 7 is a flow chart illustrating an exemplary process for redeeming foreign currency trust shares from the perspective of the Trustee according to at least one embodiment of the invention. The process begins at 700 and continues to 702, at which the Trustee receives a redemption order from a participant and sends an acknowledgement at 704 confirming receipt of the same. The redemption order may indicate the amount of foreign currency trust shares being redeemed and the identity of the participant. The process continues to 706, at which the Trustee sends a notice of impending release to the Custodian. The notice of impending release may include provisional instructions directing the Custodian to release and transfer a specified amount of units to an account associated with the participant. The process then continues to 708, at which the Trustee receives an acknowledgement from the Custodian confirming receipt of the notice of impending release.

Subsequently, at 710, the Trustee receives the foreign currency trust shares being redeemed from the participant by, for example, having the shares delivered via the CSD and the Trustee receiving notice from its CSD agent confirming receipt of the shares. The process proceeds to 712, at which the Trustee also receives payment of any required fees, e.g., transaction fees to cover costs and expenses of the Trust incurred in connection with the redemption order, which fees may be paid by, for example, the participant or from the assets held in the Trust account. Control then proceeds to 714, at which the Trustee delivers a corresponding amount of foreign currency to the participant by, for example, sending release instructions to the Custodian directing the Custodian to release and deliver the foreign currency to an account associated with the participant, i.e., directing the Custodian to execute the provisional instructions included in the earlier notice of impending release. The process then proceeds to 716, at which the Trustee receives an acknowledgement from the Custodian confirming receipt of the release instructions. The process then proceeds to 718, at which the Trustee receives confirmation from the Custodian that the foreign currency units were delivered to the participant. Subsequently, the process proceeds to 720, at which the process ends.

Figure 8:
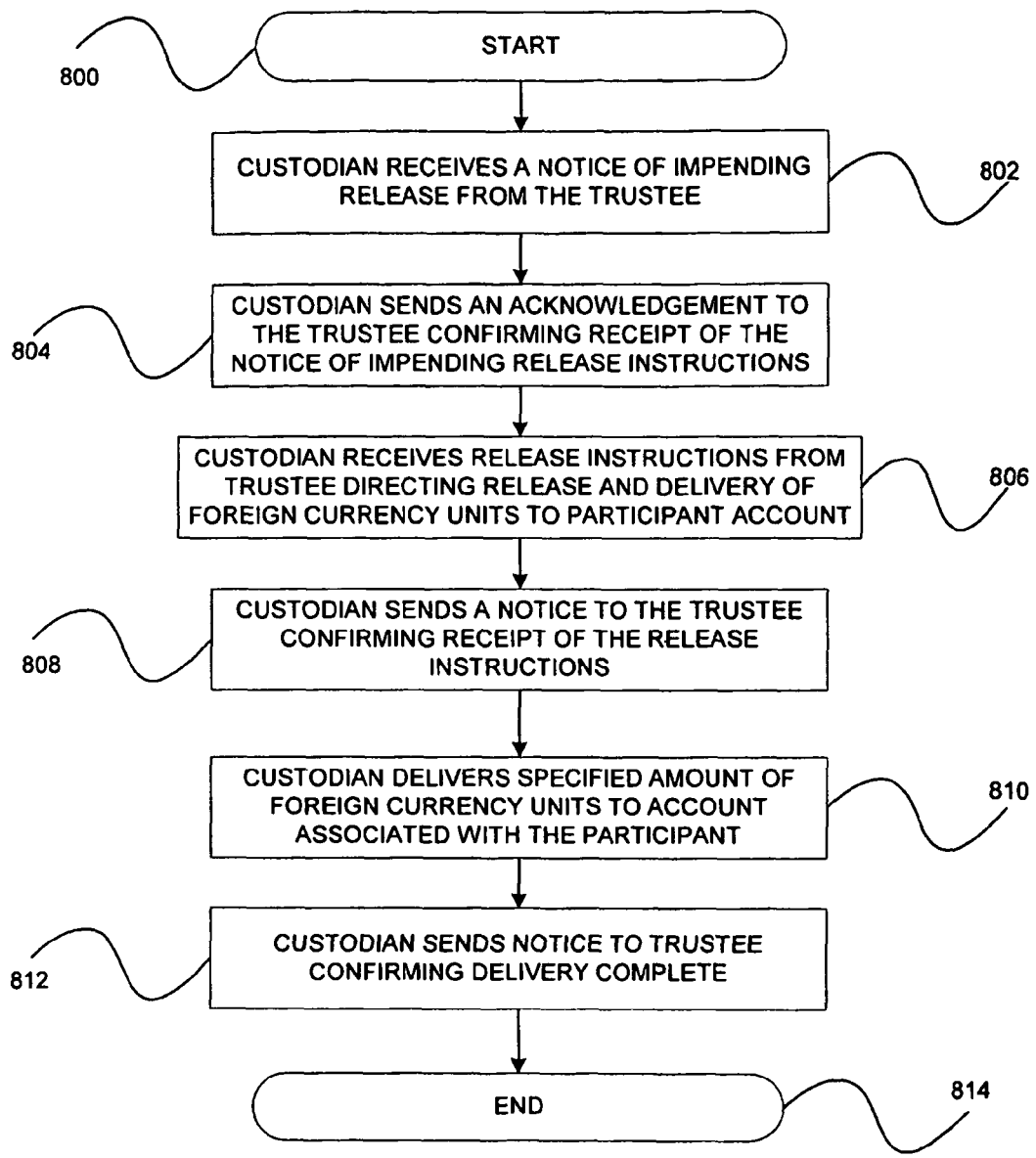
FIG. 8 is a flow chart illustrating a method for redeeming shares within the system of figure two from the perspective of a custodian in accordance with one embodiment of the invention.

FIG. 8 is a flow chart illustrating an exemplary process for redeeming foreign currency trust shares from the perspective of the Custodian in accordance with at least one embodiment of the invention. The process begins at 800 and proceeds to 802, at which the Custodian receives a notice of impending release from the Trustee, which notice may include provisional instructions directing the Custodian to release and deliver a specified amount of foreign currency trust units to an account associated with an identified participant. The process then proceeds to 804, at which the Custodian sends an acknowledgement to the Trustee confirming receipt of the notice of impending release instructions. Subsequently, at 806, the Custodian receives release instructions from the Trustee directing the Custodian to release and deliver a specified amount of foreign currency units to an account associated with an identified participant, i.e., directing the Custodian to execute the provisional release instructions included in the earlier notice. The process then proceeds to 808, at which the Custodian sends a notice to the Trustee confirming receipt of the release instructions and, at 810, the Custodian delivers a specified amount of foreign currency units to an account associated with the participant. Subsequently, at 812, the Custodian sends a notice to the Trustee confirming that the delivery is complete. Then, the process proceeds to 814, at which the process ends.

According to at least one embodiment of the invention, a Trust account may comprise an unallocated Trust account. An unallocated Trust account is a foreign currency account maintained in the name of the account holder (e.g., the Trustee 202) in which foreign currency is received and held on an "unallocated basis" for the account holder, i.e., the Trustee 202 has no interest in specific foreign currency trust units held in the account. Instead, the account holder is entitled to an unsegmented quantity of the Custodian's inventory of foreign currency standing to the credit of the Trust.

According to at least one embodiment of the invention, all transfers of foreign currency into and out of the Trust in connection with the creation and redemption of shares may be done through credits and debits to the unallocated Trust account as follows. Upon creation of trust shares, foreign currency may be transferred into the Trust by crediting a quantity of foreign currency deposited by the participant to the unallocated Trust account. Thereafter, the Custodian transfers the deposited amount of foreign currency from the unallocated Trust account to the allocated Trust account by transferring specific foreign currency trust units held in the Custodian's inventory into the allocated Trust account corresponding to the quantity of foreign currency deposited in the unallocated Trust account (to the extent that the deposited quantity can be represented by whole foreign currency trust units). Because the deposited foreign currency amount is allocated in multiples of whole units only, the amount of foreign currency allocated from the unallocated Trust account to the allocated Trust account may be less than the total foreign currency quantity deposited by the participant. The balance may continue to be held in the unallocated Trust account.

The process of transferring foreign currency out of Trust in connection with a redemption of shares may follow the same general procedure described above in reference to creation of shares, only in reverse.

It should be noted that foreign currency trust shares can represent an equity interest in the foreign currency Trust. Thus, each share would represent a proportionate interest in the foreign currency Trust and the value of each trust share should track the proportionate value of foreign currency trust. Alternatively, foreign currency trust shares can represent some other form of redeemable "marker" that represents a proportionate interest in the Trust. For example, each share can actually be a debt instrument or a hybrid equity/debt instrument. In other words, a participant can be seen as loaning a certain amount of foreign currency to the Trust. In return for the loan, the Trustee can cause a certain amount of shares (thought of in this context as notes) to be delivered to the participant. Each note could, for example, represent one unit of foreign currency. Notes could still be created in baskets, e.g., of 500,000 notes, and the value of each note could still be approximately equal to the proportionate value of the Trust.

Thus, the invention described herein, and specifically the term "share(s)" should be understood as covering any type of exchange-traded security. As a result of this alteration, a note creation process may involve creating notes that can still be traded on a secondary market and redeemed for the associated amount of foreign currency. Thus, it should be understood that the systems and methods described herein are not dependant on whether shares represent equity or debt instruments.

It should be understood that foreign currency receipts may actually be the redeemable marker, e.g., in embodiments where foreign currency receipts are created and redeemed as opposed to the physical foreign currency as described above.

It should also be understood that the role of custodian can also be performed by the Trustee. In other words, if the Trustee has the capability, then the Trustee can receive, store and deliver foreign currency as required.

In accordance with at least one embodiment, the minimum amount of purchase or redemption for a primary market, i.e., the market consisting of participants, correlates with the foreign currency futures market, to facilitate purchase of shares and improve liquidity, transparency, and hedging alternatives.

No minimum purchase or redemption amounts, however, need apply to the secondary market, except for any existing exchange minimums.

The Trust can thus provide benefits to both the institutional and retail markets by providing a liquid security the performance of which correlates with the performance of foreign currency, or some other commodity. In addition, significant hedging of trust shares with, e.g., the foreign currency futures market can also be facilitated. As is often the case with ETFs, liquidity and hedging alternatives work to keep spreads tight between the bid and ask on trust shares.

In accordance with at least one other embodiment, a participant may elect to deliver or receive U.S. dollars instead of delivering or receiving foreign currency trust units to/from the Trust.

In the case of a creation order, the participant may elect to deliver U.S. dollars corresponding to the amount of foreign currency that is required to create the requested foreign currency trust shares. Thereafter, the Trustee may use the U.S. dollars to buy the required foreign currency on the spot market. The purchased foreign currency is then deposited in the Trust account and the corresponding foreign currency trust shares are delivered to the participant as described above in reference to the process for creating foreign currency trust shares.

In the case of a redemption order, the participant may elect to receive U.S. dollars value for the foreign currency corresponding to the tendered foreign currency trust shares. In that event, Trustee may withdraw the foreign currency from the Trust account, sell the foreign currency on the open market and give the proceeds to the participant.

In both creation and redemption orders, if the Trustee is not a qualified broker/dealer for foreign currency, then the Trustee may engage a qualified broker/dealer to perform the buy/sell transactions described herein.

Figure 9:
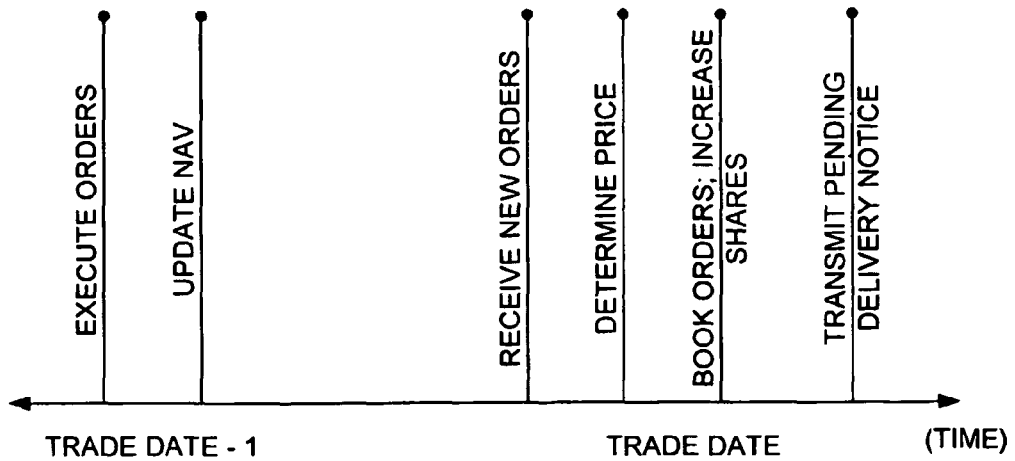
FIG. 9 is a time line illustrating the steps performed by a Trustee leading up to a trade date with respect to a creation or redemption transaction in accordance with one embodiment.

FIG. 9 is a timeline illustrating when certain actions are taken by a Trustee in relation to a trade date for a given trade in accordance with at least one embodiment of the invention. As illustrated in FIG. 9, the day before the trade (Trade date−1), the Trustee can execute previous creation and/or redemption orders and set up an account in a clearing system. That clearing system may be implemented in whole or part in the internal system used by Trustee to clear transactions. Thus, on that same day, the Trustee can update the Net Asset Value (NAV) of the Trust based on the executed creation and/or redemption orders.

On the trade date, the Trustee can receive new creation and/or redemption orders from a participant. In accordance with at least one embodiment, all such orders received before a certain publicly disclosed time may be associated with that date. The Trustee can then price the new creation and/or redemption orders based on the NAV determined from the previous day. The Trustee can subsequently book the new creation and/or redemption orders and cause the outstanding foreign currency trust shares to be correspondingly increased. The Trustee may then send a pending delivery notice to the Custodian, as described above.

Figure 10:
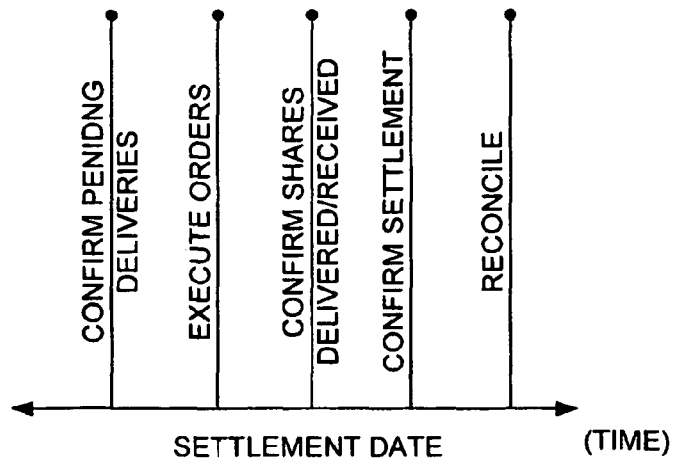
FIG. 10 is a time line illustrating the steps performed by a Trustee on a settlement date with respect to a creation or redemption transaction in accordance with one embodiment.

FIG. 10 is a timeline illustrating the action that can be taken by Trustee on a settlement date for a given transaction in accordance with at least one embodiment of the invention. On the settlement date, the Trustee can confirm all pending deliveries to or form a Custodian. The Trustee can then cause the execution of all pending deliveries. For example, all pending deliveries can be executed on the trade date plus one day (trade date+1). In certain embodiments, execution on the day after the trade date can require that the creation and/or redemption orders are received before a certain cut-off time on the trade date. It should also be understood that, in some circumstances, the trade date may be the same day as the settlement date. The Trustee can then receive confirmation that the requisite foreign currency was delivered to or from the Custodian.

The created foreign currency trust shares can be delivered from or to the CSD; additionally, the Trustee can confirm the settlement of all share transactions. All foreign currency and foreign currency receipt positions can then be reconciled for the day.

In certain embodiments the Trust's NAV, mentioned above, can be determined by the Trustee at the close of trading on the New York Stock Exchange (NYSE) on each business day. The NAV can represent the aggregate value of the assets of the Trust less its liabilities, which include accrued expenses briefly mentioned and described above. In determining NAV, the Trustee can, depending on the embodiment, value foreign currency trust units held in the Trust based on the exchange rate for that foreign currency as determined by a reputable international currency valuation source, at, e.g., at 4:00 PM Similarly, the Trustee can also determine the NAV per foreign currency trust share.

The ordinary operating expenses associated with the Trust can be accrued daily and can be reflected in the NAV of the Trust as well. In order to pay the Trust's expenses, the Trustee can sell foreign currency held by the Trust on an as needed basis. Expenses can include fees and expenses of the Trustee, expenses associated with custody of the foreign currency trust units, printing and mailing costs, legal and audit fees, Securities and Exchange Commission (SEC) registration fees, and stock exchange listing fees, i.e., fees associated with listing foreign currency trust shares on a secondary market in order to make them available to investors.

In accordance with at least one embodiment of the invention, at least some portion of the currency included in the Trust may be transferred into an interest bearing account(s), e.g. a sweep account(s), repurchase agreements, time deposits, etc., at, for example, the Custodian or another institution indefinitely or on a periodic basis, e.g., nightly. Such an account is also specific to a particular type of currency; therefore, each account may not include more then one type of currency. As a result, interest may be generated on the portion of the currency included in the account(s). That generated interest may be used to cover partially or completely cover the Trust expenses described above. As a result, in accordance with at least one embodiment of the invention, there is no need to sell foreign currency held by the Trust to pay Trust expenses.

Utility of the invention stems at least in part from the capability to provide investors with securities lending income as a result of the securitized nature by which the investor holds its interest in foreign currency. Investors may wish to lend their foreign currency trust shares with the intention of generating securities lending income. This income would supplement any additional interest or other type of income generated by the Trust and distributed to the Trust's investors. Moreover, by providing a securitized investment tool associated with foreign currency, the invention encourages greater investor participation in the foreign currency market(s). For example, some institutional investors have specific requirements regarding how much of their portfolio may be in particular types of assets. Because the invention provides exposure to foreign currency in an equitized form, would-be investors are able to consider an investment which, otherwise, would not have been permitted under its predetermined investment guidelines.

Additionally, the present invention may enable overcoming certain barriers-to-entry traditionally associated with investing in foreign currency.

It should be understood that, although invention embodiments have been described above in conjunction with a Trust, various embodiments of the invention may be implemented with other legal constructs, for example, any type of monetary fund that allows for acceptance of assets and issuance of corresponding shares representing some equity interest in those assets.

Further, as explained above, the commodity assets may not be limited to a single type of currency. Thus, assets held in a Trust or fund may include more then one type or currency. For example, the assets may comprise a "basket" of currencies, wherein the basket may contain fixed amounts of multiple currencies. As a further option, the fixed amounts of currencies may be weighted by a selected weighting mechanism that results in an appropriate proxy for an intended benchmark of currencies, as would be understood by one of ordinary skill in the art.

Moreover, one of ordinary skill in the art would recognize that various underlying agreements and operations are inherent within Trust or monetary fund operations. For example, the establishment of a Trust or other monetary fund, by definition requires that assets are held, e.g., by a custodian, for the benefit of a third party, e.g., investors, and an agreement with the custodian that directs the custodian to invest the assets according to at least one designated parameter; these characteristics are inherent in all Trusts or monetary funds.

While certain embodiments of the inventions have been described above, it will be understood that the embodiments described are by way of example only. Accordingly, the scope of the invention should not be limited based on the described embodiments. Rather, the scope of the invention described herein should only be limited in light of the claims that follow when taken in conjunction with the above description and accompanying drawings.

What is claimed is:

1. A method for creating trust shares in a foreign currency using an electronic trading system comprising a processor and a memory operatively connected to a network, the method comprising:
   creating a foreign currency trust and storing an electronic representation thereof in the memory;
   electronically receiving in the processor of the electronic trading system, a creation order from a participant comprising a request to create foreign currency trust shares associated with the foreign currency trust;
   providing to a custodian associated with the foreign currency trust, foreign currency corresponding to the created foreign currency trust shares and establishing custody thereof;
   electronically receiving, over the network and via the electronic trading system, confirmation of delivery into an account of an amount of foreign-currency associated with the foreign currency trust shares being requested; and
   initiating an electronic authorization over the network via the electronic trading system to release the requested foreign currency trust shares to the participant based upon the amount of foreign currency delivered into the account,
   wherein said using the network to release the requested foreign currency trust shares to the participant facilitates purchase or sale of the trust shares by an investor and provides liquidity with respect to the trading of the foreign currency corresponding to the created foreign currency trust shares.

2. The method of claim 1, further comprising acknowledging receipt of the creation order via the electronic trading system.

3. The method of claim 1, further comprising sending a notice of pending foreign currency delivery to a custodian of the account via the electronic trading system.

4. The method of claim 3, further comprising confirming receipt of the notice of pending foreign currency delivery via the electronic trading system.

5. The method of claim 1, wherein the value of the shares released is approximately equal to the value of the foreign currency delivered into the account.

6. The method of claim 1, further comprising receiving a reconciliation from the custodian via the electronic trading system.

7. The method of claim 1, wherein the foreign currency delivered into the account is foreign currency receipts.

8. The method of claim 7, wherein the value of the shares released is based on the net asset value of the received foreign currency.

9. The method of claim 1, wherein the creation order comprises a request to create of a minimum amount of shares or a multiple of the minimum amount.

10. The method of claim 1, wherein the value of the amount of foreign currency delivered into the account is not less than a minimum value.

11. The method of claim 1, wherein the electronic trading system comprises an Electronic Communication Network (ECN).

12. A computer-implemented method for creating shares in a foreign currency, said foreign currency shares being processed using an electronic trading system comprising a processor and memory connected to a network, the method comprising:
   accessing by a custodian, in the memory, a computerized account designated to account for the creation of foreign currency shares;
   receiving, by the custodian, an amount of foreign currency associated with the foreign currency shares and creating, via the processor, a representation of an amount of the foreign currency shares representing the amount of the foreign currency received;
   accessing a foreign currency trust, wherein the foreign currency shares comprise foreign currency trust shares administered by a trustee of the foreign currency trust; and
   sending, over the network via the electronic trading system, an electronic notice acknowledging receipt into the account of the amount of the foreign currency received by the custodian.

13. The method of claim 12, further comprising receiving, via the electronic trading system, a notice of pending foreign currency delivery comprising notice of an amount of foreign currency to be delivered into the account.

14. The method of claim 13, further comprising acknowledging receipt of the notice of pending foreign currency delivery via the electronic trading system.

15. The method of claim 13, wherein the amount of the foreign currency received is less than or equal to the amount indicated in the notice of pending foreign currency delivery.

16. The method of claim 15, further comprising receiving receipts for an unallocated amount of the foreign currency that is equal to the amount of shortfall when the amount of the foreign currency received is less than the amount indicated in the notice of pending foreign currency delivery.

17. The method of claim 12, further comprising generating a reconciliation detailing the amount of the foreign currency shares in the account.

18. The method of claim 17, further comprising accounting, using the electronic trading system, for the receipt of cash in an amount that is equal to at least a portion of the amount of shortfall when the amount of the foreign currency received is less then the amount indicated in the notice of pending foreign currency delivery.

19. A foreign currency trust system, comprising:

an electronic trading system comprising a processor, memory device, and a network connection, wherein the memory contains data therein representing a foreign currency trust that holds an amount of a foreign currency received by a custodian, a trustee interface to the electronic trading system configured to allow a trustee to administer said foreign currency trust, wherein the foreign currency trust comprises a number of foreign currency trust shares corresponding to said amount of the foreign currency received by the custodian, wherein said foreign currency trust shares facilitates purchase or sale thereof by an investor and provides liquidity with respect to the trading of the foreign currency corresponding to the created foreign currency trust shares.

20. The system of claim 19, further comprising a computer interface between one or more custodians and the electronic trading system, wherein each custodian has custody of a portion of said foreign currency.

21. The system of claim 19, wherein the electronic trading system comprises an Electronic Communication Network (ECN).

22. The method of claim 1, further comprising enabling trading the foreign currency trust shares over the network as an exchange-traded security on a securities exchange.

23. The method of claim 22, wherein the securities exchange is the New York Stock Exchange.

* * * * *